W. F. KOELLER.
AUTOMOBILE DOOR LOCK.
APPLICATION FILED JAN. 7, 1920.
1,372,300.
Patented Mar. 22, 1921.
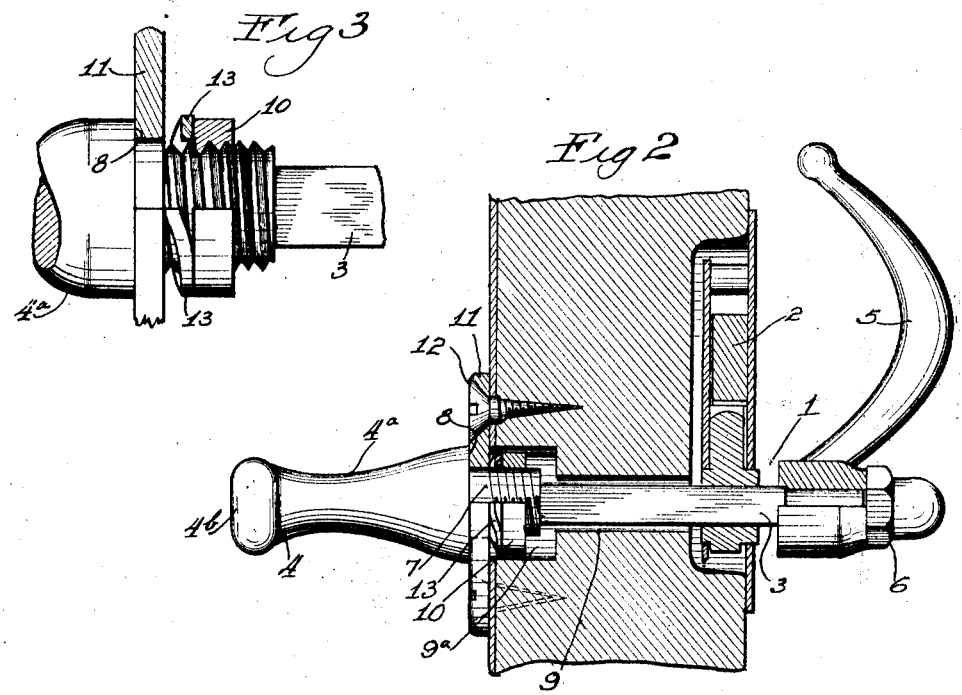
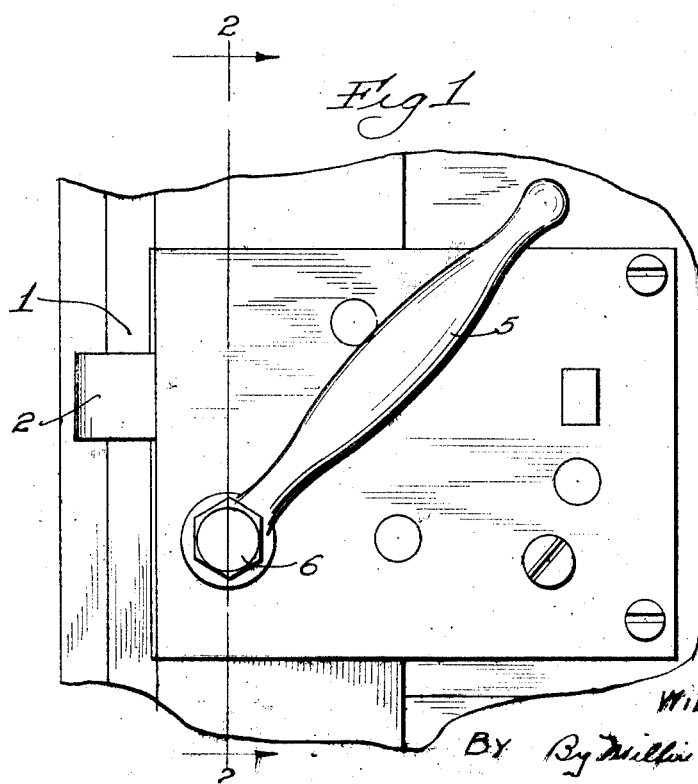
INVENTOR
WILLIAM F. KOELLER.
BY
ATTORNEYS.

UNITED STATES PATENT OFFICE.

WILLIAM F. KOELLER, OF CHARLOTTE, MICHIGAN, ASSIGNOR TO HANCOCK MANUFACTURING CO., OF CHARLOTTE, MICHIGAN, A CORPORATION OF MICHIGAN.

AUTOMOBILE-DOOR LOCK.

1,372,300.

Specification of Letters Patent.    Patented Mar. 22, 1921.

Application filed January 7, 1920. Serial No. 349,956.

*To all whom it may concern:*

Be it known that I, WILLIAM F. KOELLER, a citizen of the United States, residing at Charlotte, in the county of Eaton and State of Michigan, have invented certain new and useful Improvements in Automobile-Door Locks, of which the following is a specification.

The invention relates generally to locks for automobile and like doors, and has more particular reference to the mounting of the latch operating handle of the door, the general aim being to provide a construction combining the features of simplicity, durability and neatness in appearance.

As heretofore mounted the handles and adjacent parts of automobile and similar doors become in time worn and work loose, with the result that an objectionable rattle must be endured. The principal object of the present invention is to mount the handle in such a way as to effectively overcome this objection.

In the accompanying drawings, wherein I have illustrated a preferred embodiment of the invention, Figure 1 is a fragmentary side elevation of the inner side of an automobile door provided with a handle mounted in accordance with the invention. Fig. 2 is a vertical sectional view taken on line 2—2 of Fig. 1. Fig. 3 is a fragmentary detail view, on an enlarged scale, of parts shown in Fig. 2.

The lock, as shown herein, is applied to an automobile door of usual construction. 1 designates the lock proper, comprising a casing inclosing mechanism for actuating the latch 2.

3 designates the squared operating stem or rod of the lock or latch mechanism and 4 designates the handle with which the rod 3 is made rigid. At its inner end, the rod 3 carries an inside operating handle 5 held thereon by means of a nut 6.

The handle 4 comprises the usual hand portion $4^b$ and a stem portion $4^a$. The stem portion $4^a$ has a reduced inner end 7 providing a shoulder 8. In the door is provided an opening 9 through which the rod 3 extends, and said opening is enlarged at its outer end, as at $9^a$ to receive the reduced portion 7 and a washer 10 fixed thereon. Preferably the reduced portion 7 and the washer are screw-threaded for the purpose of adjustment.

Bearing against the shoulder 8 is an escutcheon or plate 11 which is secured in the usual way to the outer face of the door by means of screws 12; and entered between the plate 11 and the washer 10 is a resilient member 13. This member 13 may be of any suitable form being herein a corrugated washer made of spring steel and surrounding the reduced portion 7 of the handle. The shoulder 8 and washer 10, it will be observed, constitute relatively fixed abutments spaced a short distance apart to receive the escutcheon 11 and the member 13 between them, and, the escutcheon being fixed, the member 13 acts upon the washer 10 to hold the shoulder 8 snugly against the outer face of the escutcheon.

It will be seen that the employment of the spring member 13 enables the quick and easy assembling of the parts so as to permit of a comparatively easy turning of the handle without mounting it so loosely as to permit it to rattle in the vibration of the machine. Moreover, any wear occurring between the relatively movable parts is taken up by the resilient member so that the handle remains for an indefinite length of time in its initial efficient operating condition.

I claim as my invention:

1. In an automobile or like door lock, a latch operating rod, a handle having a stem portion providing an annular shoulder, an abutment on the stem, an escutcheon fixed to the door and arranged to bear against said shoulder, and a corrugated spring washer entered between the escutcheon and said abutment.

2. In a lock for automobile and like doors, the combination of a handle having a stem portion rotatable relative to the door and having a reduced portion providing an annular shoulder, a washer adjustably mounted on said reduced portion, an escutcheon secured to the door and bearing against said shoulder, and a resilient member entered between said washer and said escutcheon.

3. In a lock for automobile and like doors, the combination of a handle having a stem provided with two relatively stationary abutments spaced a short distance apart along the stem, an escutcheon rigidly secured to the door and arranged to bear against one of said abutments, and a resilient member entered between said escutcheon and the other one of said abutments.

4. The combination with a door for automobiles and the like, having a lock, of a handle having a rod for operating said lock, said handle comprising a stem, an escutcheon plate surrounding the stem and rigidly secured to the door, said stem having a bearing adapted to engage said escutcheon plate, and a resilient member acting between the escutcheon plate and the stem to force the latter inwardly whereby to hold said bearing at all times snugly against the outer surface of the escutcheon plate.

In testimony whereof, I have hereunto set my hand.

WILLIAM F. KOELLER.